United States Patent [19]

Swearengin et al.

[11] Patent Number: 5,276,997
[45] Date of Patent: Jan. 11, 1994

[54] PLANTER WITH BUILT-IN WATER DISTRIBUTION SYSTEM

[76] Inventors: Michael L. Swearengin, 9880 Gun Club Rd., McMinnville, Oreg. 97128; Fred Wittenberg, 11830 Dupee Valley Rd., Sheridan, Oreg. 97378

[21] Appl. No.: 891,187

[22] Filed: Jun. 1, 1992

[51] Int. Cl.$^5$ .............................. A01G 25/00
[52] U.S. Cl. .......................... 47/82; 47/48.5
[58] Field of Search .......... 47/82, 83, 79, 66, 48.5, 47/59, 62, 39

[56] References Cited

U.S. PATENT DOCUMENTS

| | | |
|---|---|---|
| D. 262,274 | 12/1981 | Lahr . |
| 1,880,364 | 10/1932 | Sestito ............... 47/39 C |
| 2,152,869 | 4/1939 | Campbell . |
| 3,063,196 | 11/1962 | Pauer . |
| 3,394,495 | 5/1966 | Mills ................... 47/39 |
| 3,685,204 | 8/1972 | O'Harra . |
| 4,123,873 | 11/1978 | Canova ............... 47/83 |
| 4,268,994 | 5/1981 | Urai . |
| 4,389,813 | 6/1983 | Jaques et al. . |
| 4,454,684 | 6/1984 | O'Hare ............... 47/59 |
| 4,825,592 | 5/1989 | Earls ................... 47/82 |
| 4,829,708 | 5/1989 | Gonzalez ............ 47/39 |
| 4,951,416 | 8/1990 | Gutridge ............. 47/39 |
| 4,986,027 | 1/1991 | Harvey ............... 47/83 |

FOREIGN PATENT DOCUMENTS 301362 2/1989 European Pat. Off. ............ 47/82

Primary Examiner—Henry E. Raduazo
Attorney, Agent, or Firm—Kolisch Hartwell Dickinson McCormack & Heuser

[57] ABSTRACT

A vertical or columnar planter is disclosed which includes a self-contained water distribution system. The planter includes a generally vertical, elongate planter body having openings at intervals along the side walls of the body. The planter is filled with soil or another growing medium which forms a continuous column within the planter. Plants are grown in openings distributed along the side walls of the planter. Each opening is configured with a protruding lower lip and an indentation along its top edge to help retain the growing medium within the planter body. A hierarchical watering system is built into the planter. The watering system supplies water for a greater time interval to the top of the planter and progressively lesser time intervals in regions lower down on the planter. The watering system helps balance the downward flow of water through the planter, providing an optimal supply of water to all plant-growing locations. The planter body is suitable for packaging and holding growing medium within its body during shipment. As such, the planter can be shipped and sold with the growing medium already in place within the planter. An alternative embodiment planter for mounting against a vertical surface is also disclosed.

11 Claims, 5 Drawing Sheets

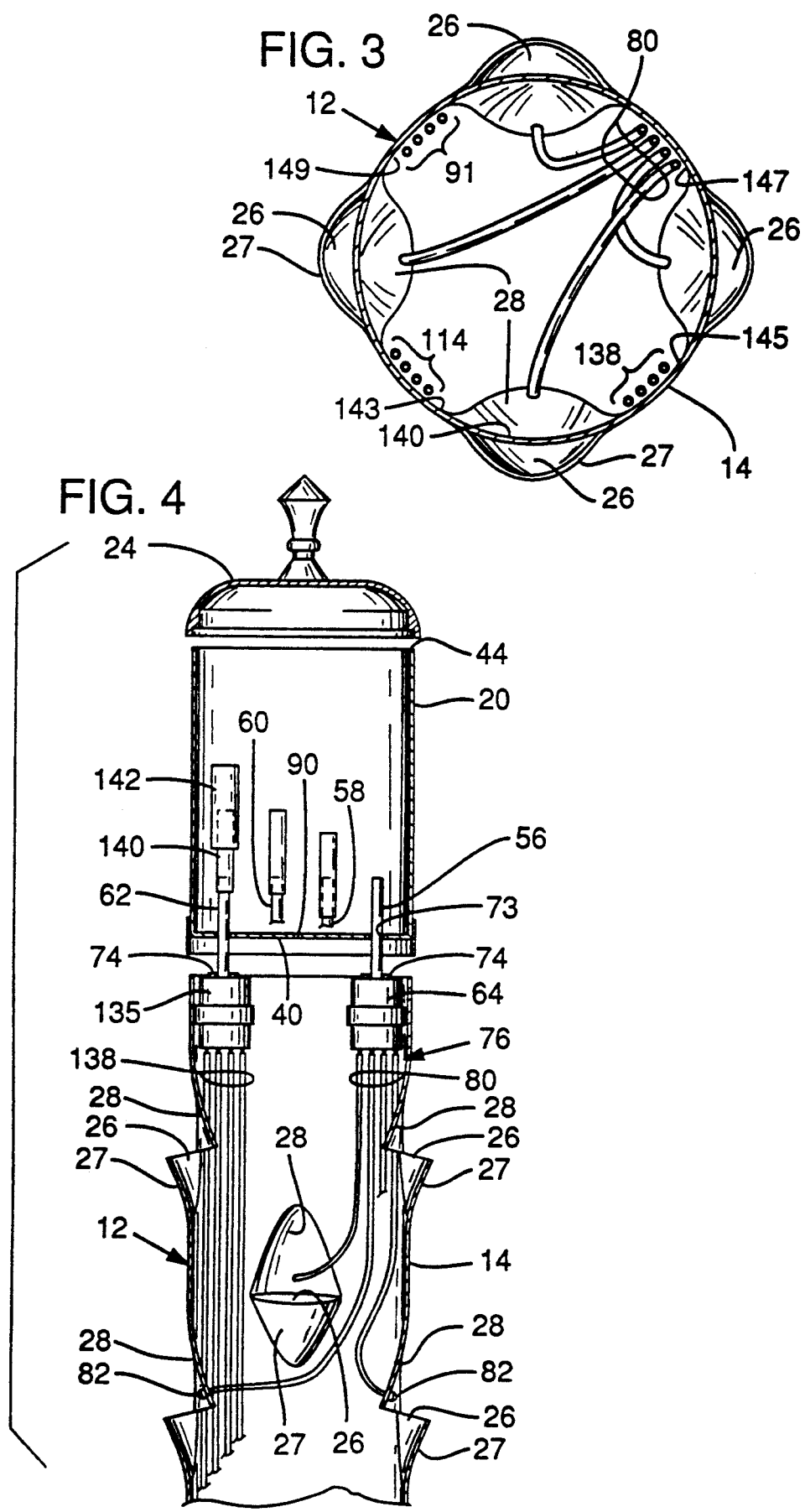

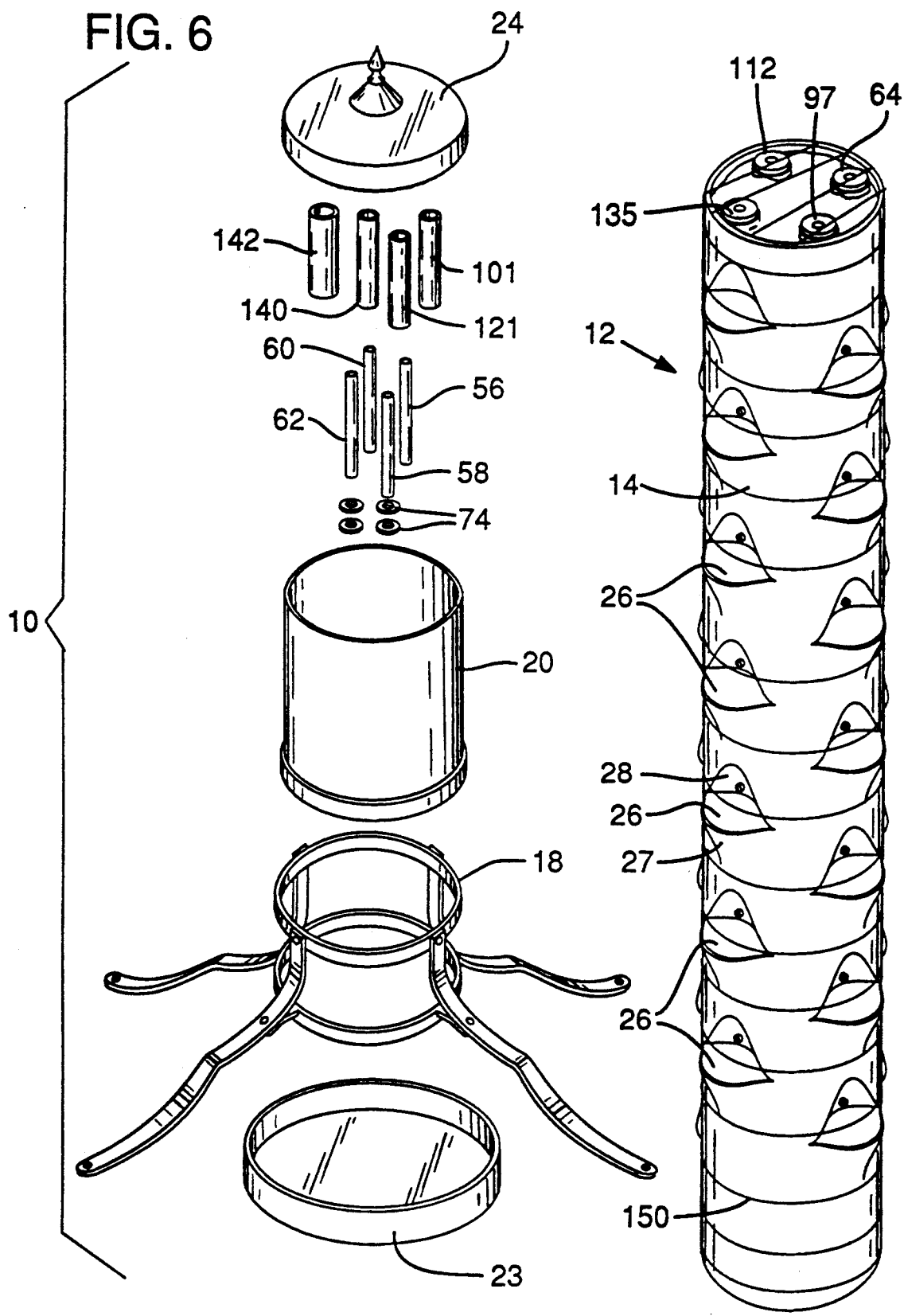

PLANTER WITH BUILT-IN WATER DISTRIBUTION SYSTEM

BACKGROUND AND SUMMARY OF THE INVENTION

The invention relates generally to plant stands for cultivating and growing plants on a vertical structure, and more particularly to a plant stand with an improved watering system for automatically supplying the proper amount of water to each of several regions in the planter.

Various types of upright or vertical planters have been devised to provide indoor and outdoor plant displays which take up relatively little floor space. Vertical or columnar planters have multiple growing locations positioned above one another along a continuous column of soil or other growing medium. One challenge presented by vertical or columnar planters is the even distribution of water for irrigating the plants. In a vertical column of growing medium, water introduced at the top of the column flows downwardly by gravity, tending to over-water lower portions of the column and under-water the top portions.

Several prior art vertical plant growing systems have attempted to deal with the problem of providing even water distribution. For example, U.S. Pat. No. 2,152,869 discloses a vertical planter which consists of multiple separate cells, each of which contains a quantity of growing medium for supporting plant growth in the cell. A water line extends vertically through the planter from cell to cell and each is watered by a separate watering nozzle. The separation between individual cells eliminates downward migration of water to the lower cells, although the planter restricts root growth and plant size for any individual plant to what a single cell can accommodate.

In U.S. Pat. No. 3,063,196, a continuous vertical column of plant-growing medium surrounds a central vertical opening in which a watering tank is positioned. Multiple small openings in the sides of the tank allow water to flow outwardly into the surrounding growing medium. Additional water is supplied to the top of the column of growing medium by providing a small ring-shaped tank above the main tank. The ring-shaped tank is refilled frequently to prevent the top of the column from drying out. The main tank is filled less frequently.

In U.S. Pat. No. 4,268,994, a unitary column of growing medium is watered by a tank positioned above the column using a variety of techniques to attempt to spread the water throughout the medium. In one embodiment, long water-soaked wicks extend from the tank into the medium. In another embodiment, internal walls or baffles retard the downward flow of water through the column.

A problem with prior art approaches to watering plants growing in vertical columns of growing medium is the difficulty of controlling the quantities of water provided at different levels in the column. The above-discussed prior art patents, particularly U.S. Pat. No. 3,063,196, acknowledge the need to provide additional water near the top of the column to prevent drying out. Nevertheless, the system used in U.S. Pat. No. 3,063,196 does nothing to reduce the risk of over-watering the lower part of the planter. The planter is also inconvenient to use, requiring one of its tanks to be refilled frequently.

Still another problem presented by prior art planters, including vertical planters, is that they can be bulky to package and ship and are inconvenient to set up. Planters are generally hollow structures which can waste packaging space and materials. Soil or another growing medium is usually supplied separately from the planter. Before the planter can be used, the soil must be transferred to the hollow interior of the planter.

It would be advantageous to provide a plant growing system which is specifically designed to allow the growing medium to be stored and supplied with the planter, saving space and packaging and simplifying set-up.

It would also be advantageous to have a plant growing system which optimizes the water provided to each plant growing on the planter, without over-watering the lower part of the column of growing medium.

It would also be advantageous to have a watering system for planters which allows selected amounts of water to be distributed to specific regions of the planter.

Accordingly, the present invention provides a plant growing system comprising a container for holding a growing medium in which plants are cultivated. The container has top and bottom ends and side walls extending between the ends to generally surround an interior space. The side walls include a plurality of openings which form plant-growing locations for growing plants in the openings, with the plant roots in growing medium within the container and the foliage of the plants extending along the side walls outside the container. A water distribution system is provided for conducting water to selected regions of the container by means of a plurality of separable branch conduits. One branch conduit, termed the first branch conduit, is formed of one or more tubes supported on the container for supplying water to a first region of the container. A second branch conduit supplies water to a second region of the container, the second region being above the first region. A water supply controller is operatively connected to the water distribution system for supplying selected amounts of water to each branch conduit. In that way, different amounts of water can be supplied to the first and second regions of the container via the respective first and second branch conduits.

The planter structure is suitable for containing, storing and shipping both the planter and the growing medium used to grow plants. During storage and shipment of the planter body, the growing medium is retained within the body by means of a removable enclosure, preferably in the form of flexible sheet material which wraps around the exterior of the body. The removable enclosure closes the openings and retains the growing medium within the body.

In its preferred form, the planter structure is an elongate, cylindrical pipe oriented vertically when in use growing plants. The pipe has an open top and a plurality of openings formed in the cylindrical side walls. Each opening includes a protuberance along the lower edge of the opening forming an outwardly-projecting lip which helps retain the cultivation medium within the opening when the container is in use. A water distribution system on the planter includes a water tank positioned to supply water to the planter by gravity. The tank is preferably positioned on top of the planter. Branch water conduits including one or more water conduit tubes are operatively connected to the tank to conduct water from the tank to selected regions of the container. A plurality of outflow openings positioned at different levels in the tank are connected to the branch conduits. The height of each outflow opening selects the level of water in the tank at which flow into the opening stops as the tank is drained. The outflow openings preferably can be repositioned within the tank. In other words, the height of each outflow opening is adjustable to select the level at which outflow from the tank stops, determining the length of time and quantity of water supplied to each branch conduit during a fill and drain cycle of the tank.

DESCRIPTION OF THE DRAWINGS

FIG. 3 is a cross-sectional view of the planter of FIGS. 1 and 2 taken along line 3—3 of FIG. 2.

FIG. 4 is a partial, partially exploded, view of the top part of the planter of FIGS. 1-3.

FIG. 6 is a disassembled view of the planter of FIGS. 1-5 illustrating the enclosure wrapping used to secure the vertical planter body and growing medium for shipping.

FIG. 7 is a perspective view of another embodiment of the present invention illustrating a planter designed for mounting against a wall or another vertical surface.

DETAILED DESCRIPTION OF THE PREFERRED EMBODIMENT

Figure 1:
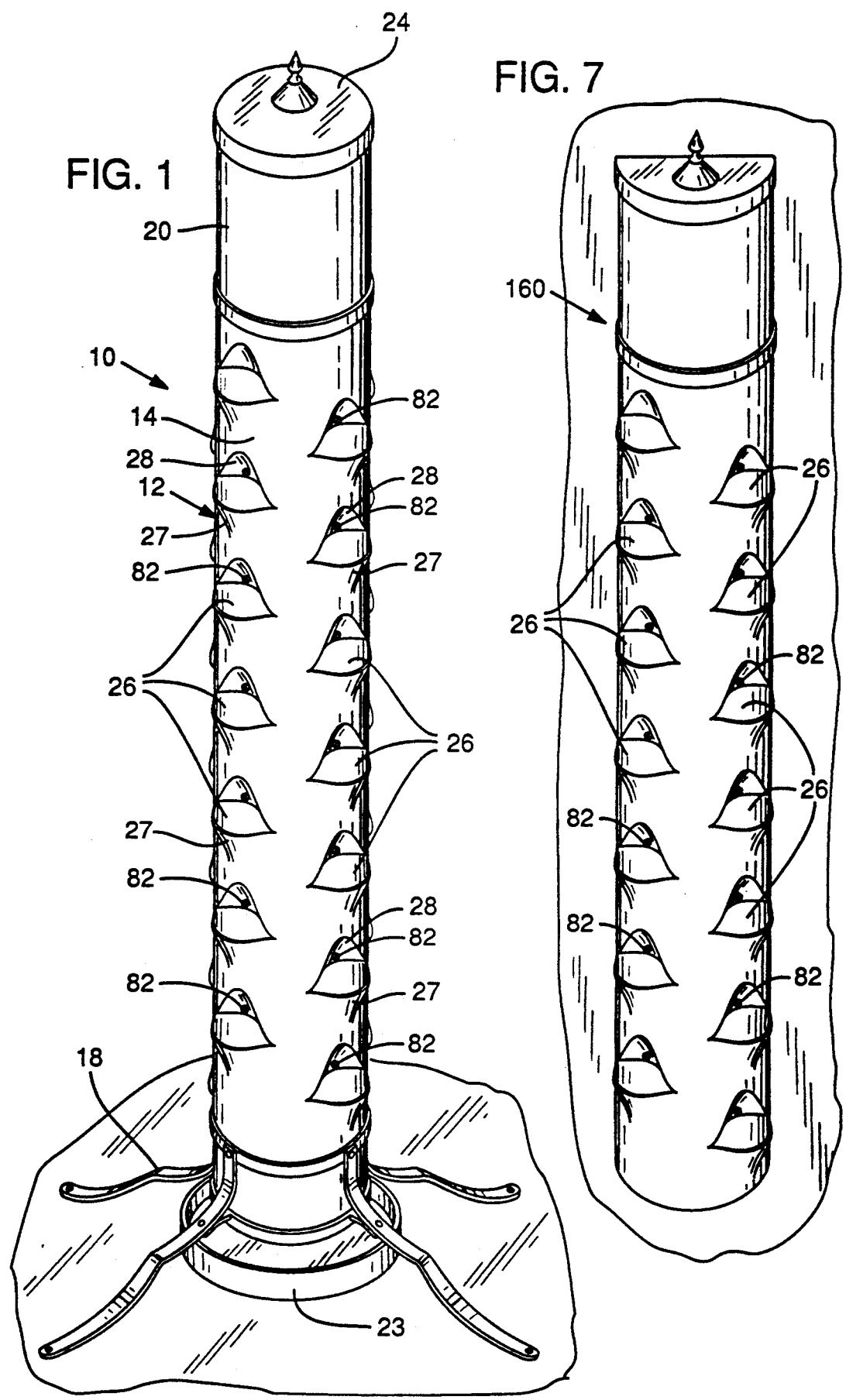
FIG. 1 is a perspective view of a first embodiment of a planter structure, water tank and stand as used with the plant growing system of the present invention.

Referring to FIG. 1, planter 10 is a first embodiment of the plant growing system of the present invention. Planter 10 is a free-standing structure of a type known as a vertical planter or plant totem. Principal structural elements of planter 10 include an elongate, cylindrical pipe, oriented vertically when in use, referred to as the body 12 of the planter. Planter body 12 has generally cylindrical side walls 14 and an open or hollow interior which is filled with soil or another growing medium when growing plants. The cylindrical body 12 is alternatively known as the growing medium container portion of the planter. The walls 14 of cylindrical pipe 12 are preferably formed of polyvinylchloride (PVC) pipe or a similar plastic or fiberglass material. Alternatively, pipe 12 can be formed of metal or a composite material. Although planter 10 can be constructed in any size, a suitable size for pipe 12 would be 6-inches in diameter and 4-feet in length.

A metal or plastic stand 18 is provided for engaging the lower end of the planter body to support the planter body in a vertical orientation, as shown in FIG. 1. A catch basin 23 is optionally available to position beneath stand 18 when planter 10 is used indoors. A water tank 20 with a removable lid 24 is positioned to supply water to the planter by gravity. Tank 20 is supported on top of planter body 12 for watering plants (not shown) growing in the planter.

Figure 2:
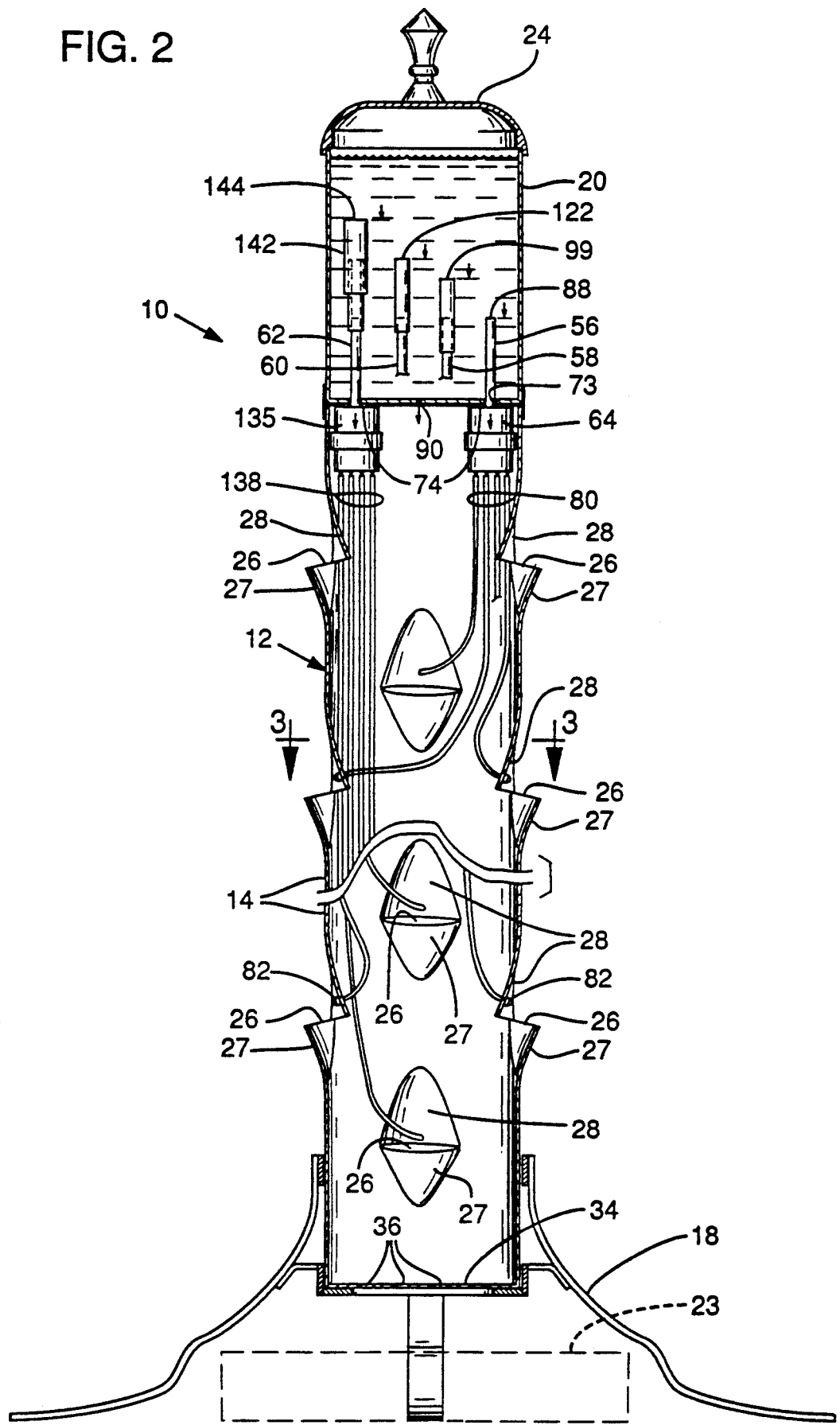
FIG. 2 is a partial view of the planter of FIG. 1, in partial cross-section, illustrating the water distribution system.

Referring to FIG. 2, which shows the first embodiment planter 10 in cross section, the side walls 14 of planter body 12 extend vertically between an open top end 30 and a bottom end 32 which is preferably capped or closed by a bottom wall 34 having multiple openings or perforations 36 therein to allow drainage of water from the planter into catch basin 23. A plurality of openings 26 formed in the sides 14 of planter body 12 serve as plant-growing locations. When in use growing plants, pipe 12 is filled with a plant-growing medium which allows plants to grow in openings 26 with the plant roots in the medium within the planter body an the plant foliage extending through the opening to the outside of the planter body. Openings 26 are formed in side walls 14 by cutting and deforming the side walls at selected locations. Each opening is formed by making a short horizontal cut in the wall and then bending the wall, creating an outwardly-extending protuberance 27 along the lower edge of the opening to form an outwardly-projecting lip. The upper edge 28 of each opening 26 is bent inwardly to create a small niche or indentation 28, leaving opening 26 facing generally outwardly and upwardly on vertical walls 14. If planter body 12 is made of plastic or a similar non-deformable material, openings 26 must be created before the material hardens or by reheating the material until it can be plasticly deformed. If planter body 12 is made of metal, the openings 26 can be cut and the lower protuberances 27 and upper indentations 28 formed by bending the metal using conventional metal-forming techniques.

When in use growing plants, planter body 12 is substantially filled with soil or another growing medium which forms a continuous column within the hollow interior of the vertical planter body. The shape of each opening 26, with an outwardly-projecting lower lip 27 and inwardly projecting upper indentation 28, helps retain the growing medium within the opening. Preferably, the growing medium installed in the planter will be somewhat cohesive, in the nature of soil such as humus. Non-cohesive media types such as loose sand cannot generally be used in vertical planters unless mixed with a cohesion-enhancer to keep it from flowing out through the openings. The growing medium should be formulated to remain within the vertical columnar interior of the cylindrical planter body 12.

An important consideration in the use of vertical or columnar planters is the distribution of water to the plants. FIGS. 2-5 illustrate the various parts of the water distribution system used in the present invention for conducting water to selected regions of the planter. A water tank 20 is positioned on top 30 of the vertical planter body. Tank 20 serves as a reservoir for the water distribution system. It is preferably an open-topped cylindrical tank made of any suitable material with a bottom wall 40 which rests on the top edge 30 of planter body 12. A removable lid 24 rests on the top edge 44 of tank 20, providing access to some of the interconnections with the rest of the water distribution system and to fill the tank.

The other parts of the water distribution system for conducting water to planter body 12 include a plurality of outflow openings in tank 20 which supply water to a plurality of different branch water conduits, each of which directs water to a predetermined region of the planter. Two types of outflow openings ar provided in tank 20. The first type of outflow opening is provided by one or more vertical outflow pipes which extend upwardly into the interior of tank 20 through tank floor 40. Each outflow pipe is operatively connected to a set of one or more water distribution tubes. FIG. 2, which shows water tank 20 in place on top of planter body 12, and FIG. 4, which is a partial, partially exploded view with the water tank raised off the top of planter body 12, illustrate the outflow pipes 56, 58, 60 and 62, which extend upwardly into tank 20. Each outflow tube drains water from tank 20 through an opening in the top end of the tube and delivers the water to a manifold which distributes it to one or more tubes. Each pipe, and the manifold and tubes connected to the pipe, is a separate branch conduit of the water distribution system. In FIGS. 2 and 4, the manifolds and tubes associated with outflow pipes 56 and 62 are illustrated and the manifolds and tubes associated with pipes 58 and 60 are omitted, for clarity. Each branch conduit of the water distribution system is described separately below. Outflow pipes 56, 58, 60 and 62 extend upwardly through openings (not shown) provided in the bottom wall 40 of tank 20. Preferably, the openings in tank bottom 40 (through which the outflow pipes extend) are fitted with grommets or similar sealing devices to inhibit leakage from the tank around the outflow pipes.

Figure 5:
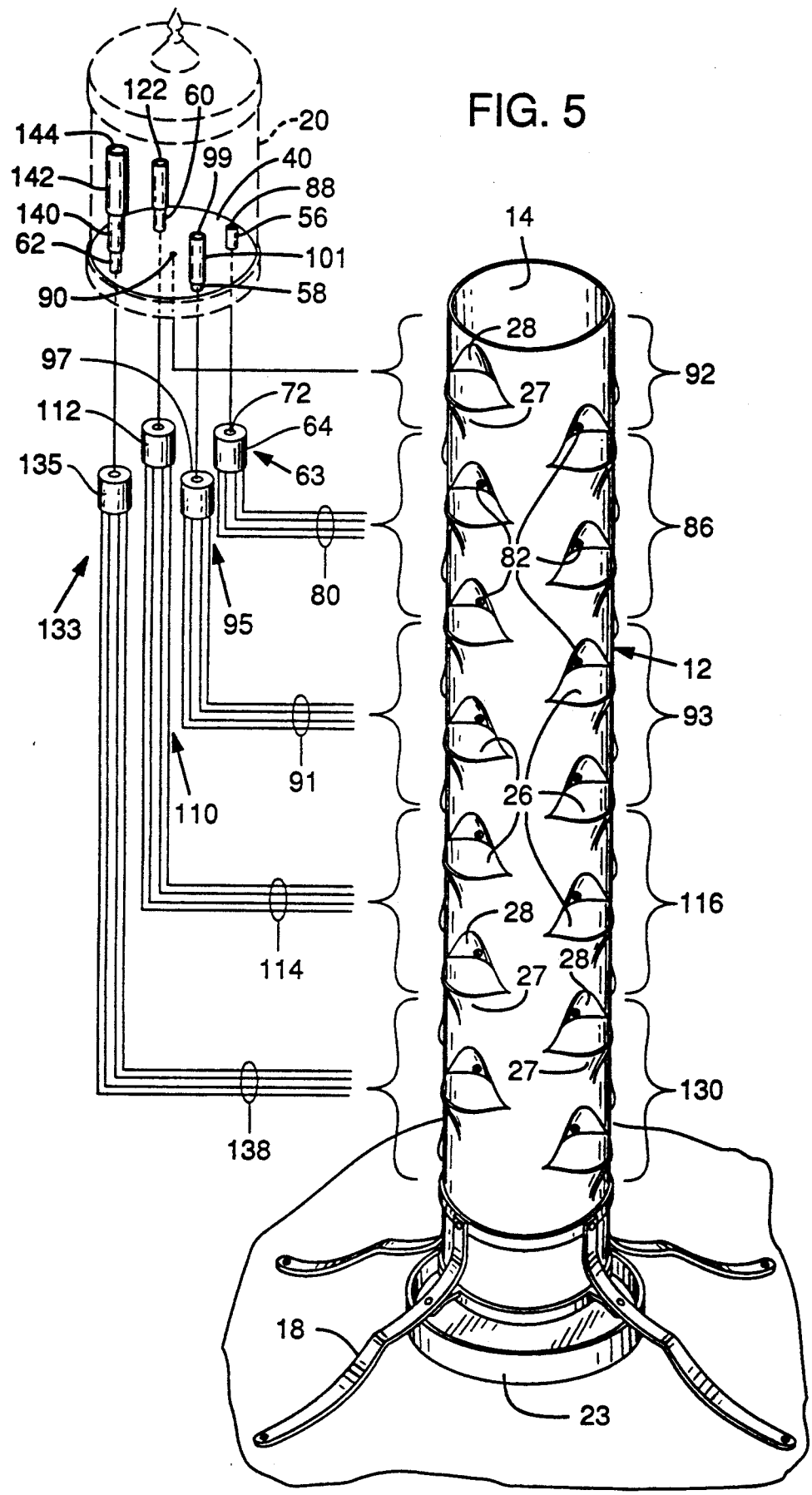
FIG. 5 is a partial schematic illustration of the water distribution system used in the present invention.

Referring to FIGS. 2, 4 and 5, the branch conduit connected to outflow pipe 56 is referred to as the first branch conduit 63. With limited exceptions which are noted below, the component parts of first branch conduit 63 are also used in the other branch conduits coupled to outflow pipes 58, 60 and 62. Outflow pipe 56 is coupled to the inlet opening 72 of a water distribution manifold 64. An O-ring or grommet 74 is fitted into opening 72 of manifold 64, and a similar O-ring or grommet 74 is fitted to the inlet openings of the manifolds coupled to the other outflow pipes 58, 60 and 62, to provide a water-tight seal between each outflow pipe and the manifold to which it is coupled. Manifold 64 is a small enclosed body which feeds water from its inlet opening 72 to one or more outlet openings 76. FIGS. 2, 4 and 5 show manifold 64 coupled to four outflow tubes 80, which are small-diameter (i.e., approximately ⅛-inch diameter), rigid, semi-rigid, or flexible tubes, each of which extends from the manifold outlet to a plant-growing location located at openings 26 on the planter. Each tube 80 terminates in a flow-control nozzle 82 (see FIGS. 1, 2 and 4) supported on the planter body adjacent one of the plant-growing openings 26. The preferred location for nozzles 82 is in the indentation 28 immediately above the outwardly-projecting lower lip 27 of each opening. The nozzles are fitted on the outside walls of the planter and each is interconnected to one of the tubes 80 through a small opening formed in indentation 28. In that location, water can drop downwardly from the nozzle into the opening 26.

The water distribution manifolds and tubes used on planter 10 are preferably of the type used in drip irrigation systems. Nozzles 82 are referred to as "bug-button" nozzles which are available in different sizes and drip rates. Another name for a nozzle 82, used in irrigation terminology, is "emitter."

Outflow pipe 56, manifold 64 and tubes 80, referred to collectively as the first branch conduit 63 of the watering system, supply water to a plurality of plant-growing openings 26 in a first region 86 of planter 10 (see FIG. 5). Although the illustrations in FIGS. 2, 4 and 5 show each manifold distributing water to only four tubes, each of which is connected to a nozzle positioned over an opening 26, the exact number of openings supplied with water by each branch conduit is a matter of design choice and can be varied. The first embodiment planter 10 of FIGS. 1-5 is depicted as having 28 openings around its periphery. As described below, the preferred watering system of the first embodiment planter is divided into five branch conduits. Thus, the average number of openings supplied with water by each branch conduit is 5.6. Since irrigation manifolds are available (or can be modified) to supply water to four, five, six or any other number of lines, it should be understand that the depiction of four tubes supplied from each manifold is for illustrative purposes only, to avoid the confusion which would result from showing a larger number of tubes. Nevertheless, the actual number of tubes and nozzles supplied with water in the branch conduits on planter 10 can vary between branch conduits and would probably exceed four.

In operation, first branch conduit 63 carries water from tank 20 to plant-growing locations in a first region 86 of planter 10. When tank 20 is filled with water, water enters first branch conduit 63 through the top opening 88 of outflow pipe 56 and is carried to manifold 64. Manifold 64 distributes the water to tubes 80, which supplies the water to a plurality of nozzles 82 in first region 86, irrigating the plants in that region of the planter. During each fill cycle of tank 20 (i.e., when the tank is filled and allowed to drain until empty) water will flow into pipe 56 as long as the water level in tank 20 is above the level of outflow opening 88, after which the flow of water to first region 86 of planter 10 will cease.

Planter 10 also is provided with a second, simpler type of water distribution conduit in the form of one or more drip holes which extend through the bottom wall 40 of tank 20. The one or more drip holes, termed the second branch conduit, supply water to the very top of the planter. The first embodiment of planter 10 includes a single, small drip hole 90 (shown in FIGS. 2, 4 and 6), which allows water to pass from tank 20 directly onto the top of the growing medium (not shown) which substantially fills planter body 12. The very top region of planter body 12 is referred to as second region 92. As such, drip opening 90 serves as a second branch conduit for supplying water to second region 92, which is located just above first region 86.

Because drip opening 90 is positioned lower on the tank than outflow opening 88 of tube 56, water will continue to flow from tank 20 to second region 92 after it has stopped flowing to first region 86. Consequently, regardless of the flow rates of the various branch conduits, second region 92 will receive water for a longer time internal than first region 86. That helps prevent the top of the column of growing medium from drying out. The quantity of water supplied by the first and second branch conduits 63 and 90, respectively, is controlled by the size of nozzles 82 in first region 86 and the size of drip opening 90 in the second region. The relative sizes of the nozzles and drip opening should be selected to optimize the irrigation of the plants growing in the first and second regions of the planter.

In planters which are tall enough to include a large number of plant-growing locations (the preferred embodiment planter has 28 openings), several additional branch conduits are preferably provided as part of the watering system. Referring to FIG. 5, a third branch conduit 95 is provided for watering a third region 93 of planter 10. Third region 93 is immediately below first region 86. Like first branch conduit 63, third branch conduit 95 includes an outflow pipe 58 in tank 20 operatively connected to a manifold 97 and to a plurality of distribution tubes 91. The only differences between third branch conduit 95 and first branch conduit 63 are the length of the water distribution tubes 91 (tubes 91 are slightly longer than tubes 80, to reach third region 93), and the height of the outflow opening at the top of the outflow pipe.

The outflow opening into outflow pipe 58 has been raised to a higher level than the outflow opening 88 on pipe 56 (which feeds first branch conduit 63). Vertical outflow pipe 58 is fitted with an extender 101 which slides over the upper end of the pipe to raise the level of the outflow opening 99. Raising the level of the outflow opening causes water to be supplied to third branch conduit 95 for a shorter duration than for the first and second branch conduits, during each fill cycle of tank 20. That is because, as the water level descends in tank 20, it will fall below outflow opening 99 before reaching either outflow opening 88 or drip opening 90.

The watering system on planter 10 includes a fourth branch conduit 110 which is supplied with water from tank 20 through outflow pipe 60. Fourth branch conduit 110 waters a fourth region 116 of planter 10. Fourth region 116 is immediately below third region 93. Like first branch conduit 63, fourth branch conduit 110 includes a tank outflow pipe 60 operatively connected to a manifold 112 and to a plurality of distribution tubes 114. Tubes 114 are longer than tubes 91 of the third branch conduit, to reach the fourth region 116. The tank outflow pipe 60 is fitted with an extender sleeve 120, like sleeve 101 on pipe 58, to raise the level of the outflow opening 122 above the levels of openings 99, 88 and 90 in tank 20. Sleeves 101 and 120 can be repositioned on pipes 58, 60, respectively, by sliding the tubes up-or-down on the outflow pipes. Use of adjustable sleeves allows the user to raise or lower the height of the respective outflow openings. In that way, the amount of water supplied to the third and fourth regions on planter 10 can be adjusted and controlled.

Finally, the watering system on planter 10 includes a fifth branch conduit 133 which is supplied with water from tank 20 through outflow pipe 62. Fifth branch conduit 133 supplies water to a fifth region 130 on planter 10. Fifth region 130 is immediately below fourth region 116. Like first branch conduit 63, fifth branch conduit 133 includes tank outflow pipe 62 operatively connected to a manifold 135 and to a plurality of distribution tubes 138. Tubes 138 are slightly longer than tubes 114 in fourth branch conduit 110 to reach the fifth region 130 of planter 10. In addition, the outflow opening into outflow pipe 62 is raised by including one or more sleeves on outflow pipe 62. In the preferred embodiment, outflow pipe 62 is fitted with a first sleeve 140 which raises the height of the outflow opening to a level approximately the same as opening 122 on tube 60, and additionally is fitted with a second sleeve 142 which further raises the height of the outflow opening 144. Sleeves 140 and 142 are adjustable relative to pipe 62 to allow the user to raise or lower the level of outflow opening 144.

The above-described water distribution system for planter 10 provides selected amounts of water to each of several regions in the planter. Whenever tank 20 is filled, water begins to flow through each of the five branch conduits 90, 63, 91, 110 and 133, supplying water to plant-growing locations throughout the planter. As the water level in tank 20 descends, it first reaches outflow opening 144 of fifth branch conduit 133, cutting off the water supply to fifth region 130. As the water level continues to descend, it eventually reaches the level of outflow opening 122, cutting off the water supply to fourth region 116. Continuing its descent, the water level successively cuts off the water supply to third region 93, first region 86 and, finally, to second region 92, when the tank 20 is emptied. The system provides selected amounts of water to various regions of the planter, with the least water being provided to the lowest regions and the most water being provided to the highest regions. As such, the water distribution system maintains the proper moisture level throughout the column of growing medium in planter 10.

In order to facilitate the set-up and enjoyment of planter 10, and to reduce the chance of damage to the various parts of the water distribution system, planter 10 will be pre-filled with soil or another growing medium at the time the planter is shipped to customers. Manufacturing assembly of planter body 12 includes the following steps: Starting with an empty planter body 12, water distribution tubes 80, 95, 114 and 138 are positioned and secured on the inside surface 140 of the cylindrical side walls 14 of the planter body. FIG. 3 illustrates how the tubes are arranged. The plant-growing openings 26 are oriented in four vertical columns along the walls 14 of the planter, at the three, six, nine and twelve-o'clock positions (as viewed in cross section in FIG. 3). The water distribution tubes 114, 138, 80 and 91 are distributed in four groups along the four continuous vertical wall spaces 143, 145, 147 and 149, respectively, located between openings 26. The tubes can be supported on the interior surface 140 of the planter body by any suitable means, such as hooks, straps or adhesive. To complete installation of the tubes in body 12 the lower end of each tube is fitted through an opening formed in the indentation 28 above each plant-growing opening 26, and a flow-control nozzle 82 is attached to the tube. Manifolds 64, 97, 112 and 135 are then attached in the opening at the top 30 of body 12, overlying tubes 80, 91, 114 and 138, respectively, using support straps or another type of suitable hanging bracket (not shown). Once the manifolds and tubes have been installed in planter body 12, the planter is filled with potting soil or another growing medium which forms a continuous column within the cylindrical walls 14 of the planter.

Referring to FIG. 6, the remaining assembly steps include the installation of the four outflow pipes 56, 58, 60 and 62 in the positions shown in FIG. 5 through openings (not shown) formed in the bottom wall of tank 20. The outflow pipes are fitted into grommets 74 installed in the inlet to each manifold 64, 97, 112, 135 at the time the tank is placed on planter body 12. Extender sleeves 101, 122, 140 and 142 are fitted on pipes 58, 60 and 62 as shown in FIG. 5. When cover 24 is placed on tank 20, assembly is complete.

For storage and shipment, planter body 12, filled with growing medium, is preferably wrapped in a removable enclosure such as clear plastic wrap 150 or another flexible sheet material, as shown in FIG. 6. The sheet material preferably covers all the plant-growing openings 26. If the planter is wrapped without tank 20 installed on planter body 12, plastic 150 will also cover the open top end 30 and the bottom end 32. The other parts of planter 10, including tank 20, lid 24, stand 18, the optional water collection pan 23, water outflow pipes 56, 58, 60 and 62 and associated sleeve extenders will then be boxed or packaged separately for shipment with planter body 12. Alternatively, planter 10 can be wrapped for shipment after installation of tank 20 on the top of planter body 12. That reduces the assembly required before use of the planter. If tank 20 is installed before the planter is wrapped, the lid 24 will preferably be fitted on tank 20 and the entire planter assembly will be wrapped, including planter body 12, tank 20, and lid 24. The plastic wrap will secure lid 24 and tank 20 to the planter, preventing separation during shipment. The only parts of the planter not anticipated to be wrapped for shipment are stand 18 and pan 23. By shipping the growing medium inside the planter body, the need for a separate bag or other package for the growing medium is eliminated.

To set up and use the planter, as packaged, the flexible sheet enclosure 150 is removed from planter body 12. The planter is installed vertically on stand 18 and tank 20 is filled with water. The watering system then begins to automatically distribute water to regions throughout the planter to encourage and sustain healthy plant growth.

The watering system of planter 10 allows for selectivity in the amount of water distributed to various regions of the planter. The height of the various outflow openings 88, 99, 122 and 144 (see FIG. 5) can be adjusted to provide the optimal waterflow to the lower regions of the planter. Even the height of outflow pipe 56 can be adjusted by selecting the length of the pipe. That allows the height of opening 88 to be selected in a manner similar to the height of openings 99, 122 and 144. Adjustment in the height of openings 88, 99, 122 and 144 controls the water supplied to the water distribution system, selecting the amounts of water supplied to each branch conduit. Similarly, the system allows the user to select the relative amounts of water supplied to first and second regions 86, 92, respectively, of planter 10 by selecting the height of outflow pipe 56 and the size of outflow opening 90. The result is a hierarchical watering system in which the lower parts of the planter receive water for a shorter duration (i.e., less water) and the higher or upper parts of the planter receive water for a longer duration (i.e., more water). That helps balance the water distributed throughout the planter, encouraging even plant growth. It is anticipated that, by correctly selecting the size of nozzles 82 and drip opening 90, the watering system will require refilling of tank 20 no more frequently than once each day.

It is possible to provide for automatic watering of the plants in planter 10 using the system of the present invention. For example, tank 20 can be provided with an automatic refill device which refills the tank whenever it has become drained. Alternatively, the branch conduits for distributing water to selected regions of the planter can be connected to a timed water supply mechanism which distributes water to the various branch conduits in the same manner as the various outflow openings in tank 20. In other words, the supply mechanism would supply lower regions on the planter with less water, or would supply water for a shorter duration, and the higher regions of the planter would receive more water.

Other alternative embodiments within the scope of the present invention will occur to those skilled in the art. For example, the uppermost region of the planter could be supplied with water by a manifold and distribution tubes in the same manner as the lower regions of the planter. The water distribution tubes 80, 91, 114 and 138, as well as the manifolds which feed the tubes, can be positioned on the outside of the planter body, instead of inside. The size and shape of planter 10 can also be varied within the scope of the present invention.

FIG. 7 shows a planter 160 designed to hang against a wall or other vertical surface. Planter 160 has a semicircular cross section which is generally half the size of the first embodiment planter of FIGS. 1-6 Planter 160 can be provided with the same number of branch conduits for supplying five different regions within the planter, like the first embodiment. Alternatively, planter 160, which has half the number of plant-growing openings 26 on the planter, can include a smaller number of branch conduits in the watering system for supplying water to nozzles 82. Other than the difference in the shape of the planter body and tank, the internal configuration of planter 160 would be generally the same as planter 10 of the first embodiment. Other shapes or configurations for the vertical planter of the present invention could include square or geometrically-shaped planter bodies.

What is claimed is:

1. A plant growing system, comprising:
   a container for holding a growing medium, said container having top and bottom ends and side walls extending between the ends, the side walls including a plurality of openings which form plant-growing locations for growing plants in the openings with the plant roots in growing medium within the container and the foliage extending along the side walls outside the container,
   a water tank support above said container,
   a water distribution system for conducting water to selected regions of the container by means of a plurality of separable branch conduits, including a first branch conduit operatively connected to said tank for supplying water to a first region of said container, and a second branch conduit operatively connected to said tank for supplying water to a second region of said container, said second region being above said first region, and
   a water supply controller operatively interposed said tank and said water distribution system for supplying selected amounts of water to each said branch conduit, said water supply controller including plural overflow openings positioned at different levels in said tank, each branch conduit being operatively coupled to a predetermined outflow opening to select the level of water in the tank at which the flow into the branch conduit stops whereby different amounts of water are supplied to said first and second regions via said respective first and second branch conduits.

2. A plant growing system as in claim 1 in which said side walls of said container are generally cylindrical and the top and bottom ends are equal in size.

3. A plant growing system as in claim 1 in which said container is an elongate cylindrical pipe oriented vertically when in use.

4. A plant growing system as in claim 3 in which said openings each include a protuberance along the lower edge of the opening forming an outwardly-projecting lip and an indentation along the upper edge of the opening for retaining growing medium within the opening when the container is in use growing plants.

5. A plant growing system as in claim 4 in which each tube in said first branch terminates in a flow-control nozzle supported on said container adjacent a selected opening in said first region of said container.

6. A plant growing system as in claim 5 in which each flow-control nozzle is positioned above the outwardly-projecting lip of the opening, whereby water drops downwardly into the opening from the nozzle.

7. A plant growing system as in claim 1 in which said outflow openings include one or more outflow pipes extending into said tank, each of which is operatively coupled to a branch conduit, and the height of each said outflow pipe is adjustable to selected the level at which outflow into the pipe stops.

8. A water distribution system on a planter for selectively supplying different amounts of water to selected regions of the planter, the water distribution system comprising:

a tank positioned to supply water to the planter by gravity, a plurality of outflow openings in said tank at different levels in said tank, a plurality of branch conduits for supplying water from said tank to a plurality of regions in the planter, each said branch conduit being operatively connected to a predetermined outflow opening, whereby the level of the outflow opening in said tank determines the length of time water is supplied from the tank to the outflow conduit.

9. A water distribution system on a planter as in claim 8 including one or more upwardly-extending pipes in said water tank, each said pipe having an outflow opening thereon, whereby the level of the outflow opening on each said pipe is determined by the length of said pipe.

10. A water distribution system on a planter as in claim 9 in which one or more of said upwardly-extending pipes includes a sleeve which fits onto said pipe to raise the level of said outflow opening and to permit selection of the level of said outflow opening by repositioning said sleeve relative to said pipe.

11. A water distribution system on a planter as in claim 8 in which one or more of said branch conduits includes one or more water distribution tubes supplied with water from said tank through said predetermined outflow opening.

* * * * *